S. B. STORER.
VOLTAGE REGULATOR.
APPLICATION FILED DEC. 5, 1905.
1,004,102.
Patented Sept. 26, 1911.
2 SHEETS—SHEET 2.
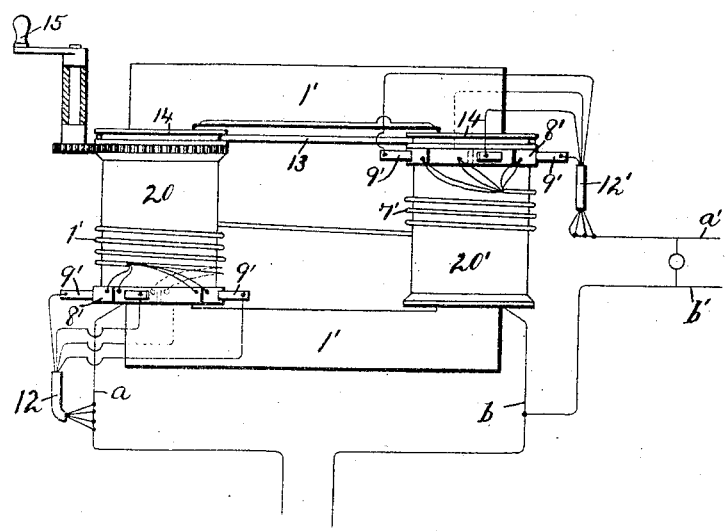
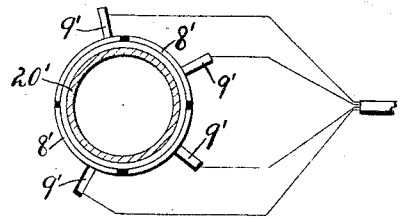

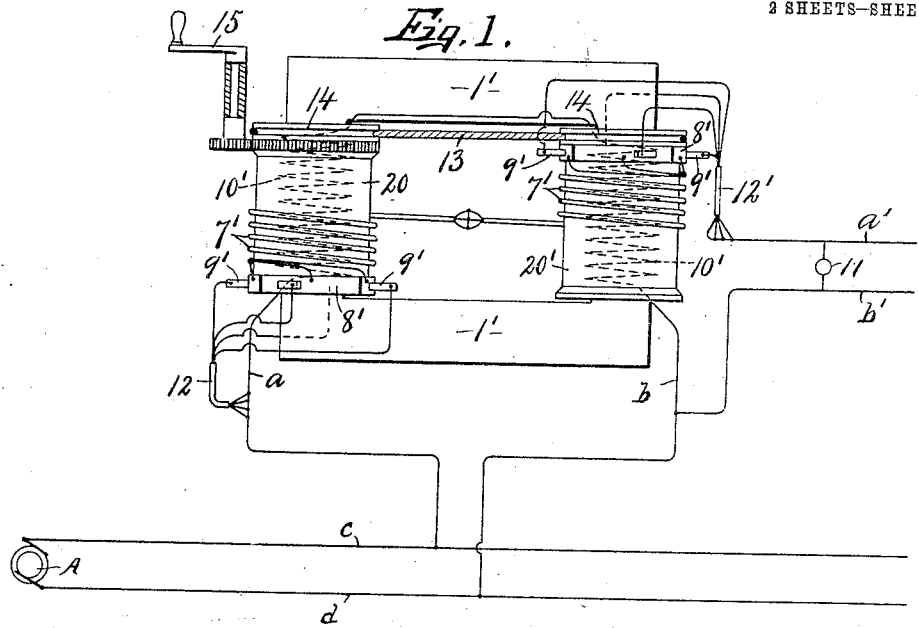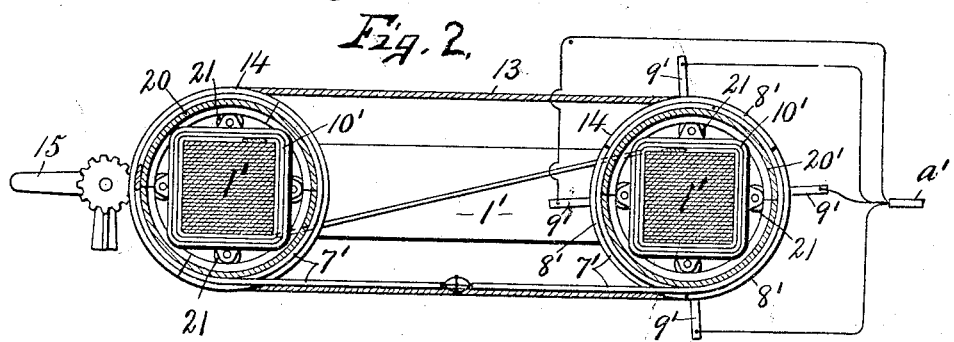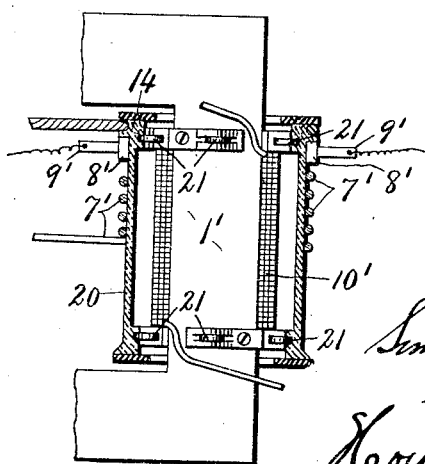

UNITED STATES PATENT OFFICE.

SIMON B. STORER, OF SYRACUSE, NEW YORK.

VOLTAGE-REGULATOR.

1,004,102.   Specification of Letters Patent.   Patented Sept. 26, 1911.

Application filed December 5, 1905. Serial No. 290,465.

*To all whom it may concern:*

Be it known that I, SIMON B. STORER, of Syracuse, in the county of Onondaga, in the State of New York, have invented new and useful Improvements in Voltage-Regulators, of which the following, taken in connection with the accompanying drawings, is a full, clear, and exact description.

This invention relates to certain improvements in voltage regulators for electric distributing systems in which an alternating or pulsatory electric current is employed for operating various translating devices at more or less distant points in one or more electric circuits deriving current from the same source.

The essential purpose of my invention is to wind the secondary coils of the transformer upon one or more (preferably two opposite) reels or revolving spools in such manner that the number of effective turns of the secondary coil may be gradually increased or diminished by simply rotating the reel or reels in one direction or the other, thereby winding and unwinding the secondary coil upon and from the reel or reels, and correspondingly and uniformly varying the voltage generated in the secondary circuit. It will be seen that this method of regulation is particularly advantageous when it is considered that the variation in the voltage which is added to or subtracted from the circuit which is being regulated, is effected smoothly, thereby establishing a very much closer regulation of the voltage in said circuit than would be possible with a step-by-step gradation, involving a variation of several volts at each step, and that by this method I also remove the extra expense of a regulating switch and its incidental liability of impairment by burning of the contacts, as well as doing away with the objectionable torque of the "induction regulator."

In the drawings—Figure 1 is a top plan of a transformer in which the reels for the secondary coils are rotatingly mounted upon opposite ends of the core and surround the adjacent primary windings. Fig. 2 is a longitudinal sectional view through the transformer seen in Fig. 1. Fig. 3 is an enlarged longitudinal sectional view through one of the reels showing the inclosed primary winding and adjacent portion of the core. Fig. 4 is a plan of a device similar to Fig. 1, showing two wires leading from each segment of one commutator to two segments of the other commutator. Fig. 5 is a transverse sectional view of a reel similar to that seen in Fig. 2 showing a modified collector having four segments and four brushes unequal distances apart.

In order that my invention may be clearly understood I have shown a working-circuit —$a'$—$b'$— in which is connected any translating device, as an electric lamp —11—, said working circuit being connected by the wire —$b'$— to one side of the circuit —$a$—$b$—, while the secondary winding —7'— is connected in the other side of said circuit through the medium of collector-rings and brushes —8'— and —9'—, and suitable wires —12— and —12'—. The primary winding, as 10'—, from the circuit $a$—$b$ is connected across an alternating-current-circuit $c$—$d$ deriving current from an alternating current dynamo —A—.

When connected as above stated, the secondary winding will have generated therein voltages in opposition to each other so that when all of the winding is on one reel it will add the total voltage generated in such winding to the working circuit; while on the other hand, if the total secondary winding is upon the other reel, the total voltage generated in such winding will be in opposition to, or subtracted from the circuit, and that in all intermediate positions of the secondary winding a voltage is added to or subtracted from the voltage in the circuit —$c$—$d$— in proportion to the relative position, or excess amount of winding or turns on one over the other.

It is, of course, evident that when half the secondary winding is on one reel and half on the other, the voltages generated in the two halves will be equal and opposite, and therefore, neutralize each other and do not affect the primary circuit or the circuit to be regulated in any manner, irrespective of the current that may be flowing in said secondary. For all other positions the effective voltage added to or subtracted from the circuit to be regulated is due to the differences between the voltages generated in the two parts of the secondary winding on the two reels.

The secondary winding upon the reels —20— and —20'— will be made of flexible wire or cable, properly insulated in any well known manner to maintain sufficient flexibility to permit it to be easily wound and unwound from one core-section to the other, said reels being connected for simultaneous rotation through the medium of a belt —13— and suitable pulleys —14— which are secured to the reels at the same side of the core of the transformer, one of the reels being operated by means of a hand-piece —15—.

In the device shown in Figs. 1 and 2, the core, as 1', is continuous or unitary, and therefore, affords a more complete and continuous magnetic circuit. In this instance, the primary winding is wound upon opposite ends of the core and inclosed by suitable reels or spools —20— and —20'— of insulating material, said spools being mounted upon suitable bearings —21—, which are supported upon the ends of the transformer-core, or in any suitable manner to avoid short-circuiting the transformer. Each of the reels —20— and —20'— is adapted to revolve around one end of the transformer-core to receive the secondary winding —7'—, which may be wound from one reel to the other by the rotation of the reels. The winding on one reel is arranged so that a voltage is generated in it in opposition to that which is generated in the winding on the other reel, and when all of the winding is on one reel it will add the total secondary voltage to that of the circuit to be regulated. When all the winding is on the other reel the total voltage will be in opposition to or will be subtracted from the voltage of such circuit in the same manner as previously described, while intermediate positions of the winding will add or subtract a voltage in proportion to the relative position, or difference between the number of turns on one and the other of the reels.

In the device shown in Figs. 1 and 2, it is obvious that if for the purpose of introducing current to or taking current from the secondary winding, each end of the secondary coil were connected to a metal collector-ring mounted on the core, or rather on one end of each reel and surrounding the core, the collector-rings would act as a short circuited secondary winding and render the device inoperative. This condition is prevented as follows. Each current collector is made up of a like number of segments —8'—, one segment of each collector being connected to a similar segment of the other collector by a separate, comparatively fine, wire or cable. Each cable is insulated from the other, thus affording as many small cables as there are segments in each collector, and these small wires or cables are usually assembled in the form of a single cable for convenience of winding and unwinding from one reel to the other, suitable anchors being provided for the extreme ends of the assembled cable to tie it to the reel, and prevent straining of the connections of the individual wires or cables with their respective segments as the cable is wound and unwound from the reels. Each reel is provided with the same number of, in this instance three, segments and the current in the secondary circuit is taken from or to each commutator by a greater or less number of, in this instance four, brushes, —9'— or one more brush than the number of commutator-segments, as it is evident that if the number of brushes and segments were equal and placed a uniform distance apart an electrical circuit through the collector-ring or commutator would be completed every time the brushes passed over the gaps or insulation between adjacent ends of the segments, which condition is avoided by using a greater or less number of brushes than there are segments, or by unequal spacing of an equal number as shown in Fig. 8 so that the brushes will never bridge all of the insulating spaces between segments at the same time. Each brush is, therefore, insulated from the others, and leading from each brush is a separate small cable, these latter cables being assembled or made up in substantially the same manner as those of the secondary winding, but there must be a sufficient length of cable from each brush or set of brushes to prevent the short circuit current that may flow therein exceeding a relatively negligible amount or value. The wires or cables of the secondary winding are electrically connected together approximately midway between their ends, thus rendering it impossible to ever completely open the circuit on account of the failure, or lack, of synchronous operation of the collector segments and brushes. It is also evident that this connection in approximately the middle of the cables enables the use of different numbers of segments as well as different numbers of brushes on each reel. It is evident that the possible combinations are almost infinite, and that it is also possible to obtain an operative device with the point of connection of the cables at some distance from the middle, it being only necessary to locate it far enough from either end to reduce the possible short circuit-current to a negligible value by having the length of the small cable through which it passes such as to make the resistance high as compared with the voltage generated in the single turn.

The devices hereinbefore described accomplish substantially the same results, but the last described form has the advantage of having a closed magnetic circuit and a relatively light moving part or parts which reduces the inertia necessary to overcome to move those parts, and also lessens the momentum or tendency to over-run or exceed the movement required to give the necessary correction to the voltage of the circuit to be regulated, thereby making this device more suitable for automatic operation, and enables me to easily regulate, either directly, or through the medium of a series-transformer, the voltage of any circuit over any range and in a uniform manner without the introduction of any high voltage or excessive currents in the secondary circuit. It also permits of a better general design of transformer, giving better regulation and less magnetizing current. For example, if the secondary winding surrounds the primary winding the regulation will be much better than if they are on opposite sides of the core.

The device shown in Fig. 4 is very similar to that shown in Figs. 1 and 2, except that each segment of one of the commutators is electrically connected to two or more segments of the other commutator which makes it unnecessary to connect the middle points of the connecting wires or cables together.

What I claim is:

1. In a voltage regulator for electrical distributing systems, a transformer, and a reel for supporting part of its winding, in combination with current collecting segments revolving with the reel, and means for taking the current to and from said segments.

2. In a voltage regulator for electrical distributing systems, a transformer and two rotary elements upon which part of its winding is adapted to be wound and unwound, in combination with a plurality of current-collecting segments rotating with each rotary element, the segments for each element being insulated from each other, and means for taking the current to and from said segments.

3. In a voltage regulator for electrical distributing systems, a transformer, separate reels upon which the secondary winding is adapted to be wound and unwound, a current collector comprising a plurality of segments insulated from each other and rotating with one of the reels, and brushes contacting with said segments.

In witness whereof I have hereunto set my hand this 27th day of November, 1905.

SIMON B. STORER.

Witnesses:
  H. E. CHASE,
  MILDRED M. NOTT.